(12) United States Patent
Yamaya et al.

(10) Patent No.: US 8,178,616 B2
(45) Date of Patent: May 15, 2012

(54) EMULSION COATING AGENT COMPOSITION AND COATED PRODUCTS THEREOF

(75) Inventors: Masaaki Yamaya, Annaka (JP); Yoshihito Osawa, Annaka (JP); Akira Yamamoto, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 39 days.

(21) Appl. No.: 11/998,038

(22) Filed: Nov. 28, 2007

(65) Prior Publication Data

US 2008/0125542 A1 May 29, 2008

(30) Foreign Application Priority Data

Nov. 28, 2006 (JP) ................................. 2006-319610

(51) Int. Cl.
*C08G 77/00* (2006.01)
(52) U.S. Cl. ........................................................ 524/837
(58) Field of Classification Search .................... 524/588
See application file for complete search history.

(56) References Cited

U.S. PATENT DOCUMENTS

| | | | | |
|---|---|---|---|---|
| 4,265,797 A | * | 5/1981 | Suk .................... | 524/389 |
| 4,324,712 A | | 4/1982 | Vaughn, Jr. | |
| 4,383,062 A | * | 5/1983 | Saad et al. .................... | 524/35 |
| 4,518,727 A | * | 5/1985 | Traver .................... | 524/35 |
| 4,525,502 A | * | 6/1985 | Traver .................... | 524/96 |
| 4,529,758 A | * | 7/1985 | Traver .................... | 524/43 |
| 4,582,874 A | * | 4/1986 | Grape et al. .................... | 524/588 |
| 4,859,359 A | * | 8/1989 | DeMatteo et al. .................... | 510/400 |
| 5,202,368 A | * | 4/1993 | Davies et al. .................... | 524/266 |
| 5,264,027 A | | 11/1993 | Martin et al. | |
| 5,973,068 A | * | 10/1999 | Yamaya et al. .................... | 524/865 |
| 6,025,077 A | * | 2/2000 | Yamaki et al. .................... | 428/447 |
| 6,048,910 A | * | 4/2000 | Furuya et al. .................... | 522/86 |
| 6,087,064 A | * | 7/2000 | Lin et al. .................... | 430/270.1 |
| 6,114,440 A | * | 9/2000 | Yamaya et al. .................... | 524/865 |
| 6,147,156 A | * | 11/2000 | Yamaya et al. .................... | 524/806 |
| 6,461,735 B1 | * | 10/2002 | Furuya et al. .................... | 428/429 |
| 6,521,699 B2 | * | 2/2003 | Feder et al. .................... | 524/588 |
| 2001/0031818 A1 | * | 10/2001 | Feder et al. .................... | 524/442 |
| 2005/0227893 A1 | * | 10/2005 | Johnson et al. .................... | 510/367 |

FOREIGN PATENT DOCUMENTS

| | | |
|---|---|---|
| EP | 1927634 B1 | 5/2009 |
| JP | 56-125466 | 10/1981 |
| JP | 58-167449 | 10/1983 |
| JP | 06172649 | 6/1994 |
| JP | 07247434 | 9/1995 |
| JP | 07316432 | 12/1995 |
| JP | 10-001610 | 1/1998 |
| JP | 10-168392 | 6/1998 |
| JP | 2000-063756 | 2/2000 |

OTHER PUBLICATIONS

European Patent Office Search Report dated Apr. 25, 2008 for European Patent Application No. 07254564.3-2115.
ISO/DIS 15184. Paints and varnishes—Determination of film hardness by pencil test. International Organization for Standardization. 1st edition. Nov. 1, 1998.

* cited by examiner

*Primary Examiner* — Robert Loewe
(74) *Attorney, Agent, or Firm* — Jenkins, Wilson, Taylor & Hunt, P.A.

(57) ABSTRACT

An emulsion coating agent composition containing: (A) one hundred parts by weight of an organosilicone resin obtained by hydrolysis and/or condensation of a mixture of a silicone oil having both reactive terminals represented by X—[$R_2$Si—O—]$_m$—$R_2$Si—X (R is selected from monovalent hydrocarbon groups containing one to twenty carbon atoms and/or aryl groups, and each R is same or different groups, X is a hydrolyzable group and/or an OH group, and m is a natural number from three to one hundred), a silane and/or a silicone in which the organosilicone resin containing a continuous linear chain structure indicated by —[$R_2$Si—O—]$_{m+1}$— (R and m are both identical to the R and m in the formula showing the silicone oil with both reactive terminals), and 5 mole % to 60 mole % of the total Si atoms in the organosilicone resin form the chain-like continuous structure; (B) one part by weight to fifty parts by weight of an emulsifier; and (C) twenty-five parts by weight to two thousand parts by weight of water.

21 Claims, No Drawings

EMULSION COATING AGENT COMPOSITION AND COATED PRODUCTS THEREOF

CROSS-REFERENCE TO RELATED APPLICATIONS

This application claims the benefit of Japanese Patent Application No. 2006-319610 filed Nov. 28, 2006, the disclosure of which is hereby incorporated herein by reference in its entirety.

FIELD OF INVENTION

This invention relates to an emulsion coating agent composition containing silicone resin that is preferably used in exterior paints for structural materials, building materials and the like and coated products thereof.

DESCRIPTION OF THE RELATED ART

In the field of paint or coating agents, a change in the dispersion medium from an organic solvent to water type has been sought in recent years from the standpoints of environmental pollution measures and securing a safe work environment. Based on such demands, emulsion type paints obtained by emulsion polymerization of radically polymerized vinyl monomers, typified by acrylic resins, were developed, and these paints are used extensively as coating agent base materials due to excellent film forming properties and chemical resistance. However, this type of paint has problems of essentially poor water resistance and weather resistance.

Silicone resins obtained by hydrolysis and condensation of silane compounds, on the other hand, have attracted attention as coating agents since they are capable of forming films with exceptional hardness, excellent weather resistance, excellent water resistance, heat resistance and water repellency.

Poly-organosiloxane or its particulate materials dispersed in water using a surfactant has been disclosed as a silicone resin for this type of coating agent (See Japanese Unexamined Patent Application Publication H07-247434, Japanese Unexamined Patent Application Publication 2000-63756.) In addition, an aqueous emulsion of an organopolysiloxane is disclosed as an example in which a silicone resin is used as a degloss and a mold releasing agent. (See Japanese Unexamined Patent Application Publication H06-172649, Japanese Unexamined Patent Application Publication H07-316432.)

Silicone resins are most commonly obtained by co-hydrolysis of various silane compound starting materials, but weather resistance declines due to a susceptibility to form cracks in the silicone coating film when the crosslinking density is raised to improve the surface protection function. Simultaneously, surface protection is not adequately realized when the crosslinking density is too low, and the coating film is too soft although the weather resistance improves. Therefore, it is difficult to achieve simultaneously weather resistance and surface protection in a silicone resin used in coating agents.

However, a silicone resin with satisfactory coating film hardness and flexibility cannot be obtained using the technology described above. For example, in a technique disclosed in Japanese Unexamined Patent Application Publication H06-172649, a flexible silicone resin is obtained by equilibrating a silicone oil with SiOH at both terminals and an alkoxysilane using a basic catalyst. In this case, a high branching degree is not attained since the silicone resin is produced using alkali equilibration, and the silicone coating film does not become hard. In addition, problems associated with inconsistent hardness in the silicone coating film are encountered since the chain-like structure of the silicone oil described above is severed during alkali equilibrating.

SUMMARY OF THE INVENTION

Therefore, the objective of this invention is to provide an emulsion coating agent composition yielding a silicone coating film that has both satisfactory hardness and flexibility and a coated product thereof.

The inventors conducted an extensive investigation and discovered that when an organo polysiloxane with a chain-like structure is included in a silicone resin in a given ratio, a linear chain structure is introduced into a silicone coating film and flexibility is imparted to the coating film while maintaining hardness in the coating film, then hardness and flexibility can coexist. This invention was completed based on the discovery.

That is, in order to achieve the object described above, an emulsion coating agent composition of this invention contains: (A) one hundred parts by weight of an organosilicone resin obtained by hydrolysis and/or condensation of a mixture of a silicone oil having both reactive terminals represented by X—[$R_2$Si—O—]$_m$—$R_2$Si—X (R is selected from monovalent hydrocarbon groups containing one to twenty carbon atoms and/or aryl groups, and each R is same or different groups, X is a hydrolyzable group and/or an OH group, and m is a natural number from three to one hundred), a silane and/or a silicone in which the organosilicone resin containing a chain-like continuous structure indicated by —[$R_2$Si—O—]$_{m+1}$— (R and m are both identical to the R and m in the formula showing the silicone oil with both reactive terminals), and 5 mole % to 60 mole % of the total Si atoms in the organosilicone resin form the chain-like continuous structure; (B) one part by weight to fifty parts by weight of an emulsifier; and (C) twenty-five parts by weight to two thousand parts by weight of water.

Preferably, the emulsion coating agent composition further containing (D) zero to fifty parts by weight of a water miscible organic solvent with an SP value from 8.0 to 11.0 and containing substantially no organic solvent other than component (D).

It is preferable that the proportion of $CH_3$— groups to the organic substituents in the organosilicone resin that is component (A) is from 50 mole % to 100 mole %.

It is preferable that the molecular terminals of the organosilicone resin that is component (A) are silanol (SiOH) groups and/or alkoxysilyl (SiOR') groups (R' represents a hydrocarbon group with one to six carbon atoms and/or a phenyl group).

Preferably, the component (D) is butyl cellosolve, butyl cellosolve acetate, propylene glycol monomethyl ether or propylene glycol monomethyl ether acetate.

A product of this invention having a substrate surface coated with a cured material of the emulsion coating agent composition.

According to the emulsion coating agent composition of the present invention, a silicone coating film satisfactory with regard to both hardness and flexibility can be obtained.

DESCRIPTION OF THE PREFERRED EMBODIMENTS

The embodiments of this invention are explained below. The emulsion coating agent composition of this invention contains components (A) through (D) described below.

<Component (A)>

Component (A) is obtained by hydrolysis and/or condensation of a mixture of silicone oil having both reactive terminals represented by X—[$R_2$Si—O—]$_m$—$R_2$Si—X (R is selected from monovalent hydrocarbon groups containing one to twenty carbon atoms and/or aryl groups, and each R is same or different groups, X is a hydrolyzable group and/or an OH group, and m is a natural number from three to one hundred), a silane and/or a silicone, and (A) is an organosilicone resin containing a chain-like continuous structure indicated by —[$R_2$Si—O—]$_{m+1}$— (R and m are both identical to the R and m in the formula showing the silicone oil with both reactive terminals), and 5 mole % to 60 mole % of the total Si atoms in the organosilicone resin are present in the chain-like continuous structure.

[Silicone Oil with Reactive Terminals]

As the R in X—[$R_2$Si—O—]$_m$—$R_2$Si—X representing a silicone oil with both reactive terminals, alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl, cycloheptyl and the like; and aryl groups such as phenyl, tolyl, naphthyl, phenylethyl and the like may be specifically cited.

It is desirable that a proportion of $CH_3$— groups to the R group in a silicone oil with both reactive terminals is from 50 mole % to 100 mole %. When the proportion of $CH_3$— groups is less than 50 mole %, the silicone coating film obtained tends to crack easily and the weather resistance trends downward.

The degree of polymerization for the chain-like structure in the silicone oil (silicone resin) with both reactive terminals is indicated by m. When m is less than three, the softness (flexibility) of the silicone coating film obtained is inadequate. When m exceeds one hundred, the coating film becomes too soft and the surface protection function declines.

As the Y in a hydrolyzable silyl group (Si—Y group), Cl group, alkoxy groups such as methoxy, ethoxy, propoxy, isopropoxy, butoxy, isobutoxy, t-butoxy group and the like; acyloxy groups such as the acetoxy group and the like; isopropenoxy group; amino group and the like may be listed as examples.

[Silane and/or Silicone]

Component (A) is produced by mixing silane and/or silicone to the silicone oil described above having two reactive terminals and allowing the mixture to undergo hydrolysis and/or condensation. As the silane and/or silicone described above, hydrolyzable silane compounds having structures $R_3$SiX, $R_2$SiX$_2$, RSiX$_3$, SiX$_4$ and the like (the same or different groups selected from monovalent hydrocarbon groups with one to twenty carbon atoms and/or aryl groups can preferably be used as the R and a hydrolyzable group can preferably be used as the X), the SiOH material obtained by hydrolyzing these hydrolyzable groups into SiOH and oligomers material that became partially hydrolyzed-condensed material can be used.

[Synthesis of Component (A)]

A known method may be used to synthesize component (A). For example, (i) a method in which a mixture of silicone oil described above having two reactive terminals, is (partially) co-hydrolyzed with a silane and/or a silicone in an organic solvent such as methanol, ethanol, methyl ethyl ketone, hexane, toluene and the like, (ii) a method in which the mixture described above is (partially) co-hydrolyzed without using a solvent, (iii) a method in which silicone materials having Si—Cl groups as the respective hydrolyzable groups of the silicone oil having two reactive terminals described above and of the silane and/or the silicone described above, and a mixed solvent (water+alcohol) are allowed to react using a de-hydrochloric method, (iv) a method in which an organosilicone resin having SiOH group terminals containing a chain-like structure is obtained by the Hydrolysis.condensation [for example, using the method (i) or (iii)] of the silicone oil having two reactive terminals described above and the silane and/or the silicone described above, and this organosilicone resin and an alkoxysilane are allowed to react to generate SiOR group terminals (R is an organic substituent) and the like may be cited. However, the method is not limited to these examples.

The component (A) (organosilicone resin) obtained in the manner described above contains a chain-like continuous structure indicated by —[$R_2$Si—O—]$_{m+1}$, and 5 mole % to 60 mole % of the total Si atoms content in the organosilicone resin form the chain-like continuous structure. The R and m in this formula are identical to the R and m in the formula for the silicone oil with both reactive terminals.

When 5 mole % to 60 mole % of the total Si atoms in the organosilicone resin form the chain-like continuous structure, the flexibility is imparted to the organosilicone resin. When the Si atoms proportion described above is less than 5 mole %, the flexibility of the silicone resin is not sufficient. When the proportion exceeds 60 mole %, the silicone coating film obtained becomes too soft and the surface protection function is not realized. The Si atoms proportion as described above of 10 mole % to 50 mole % is more preferred. The Si atoms proportion in an organosilicone resin as described above can be calculated using the charge (feed) ratio between the silicone oil with both reactive terminals and the silane and/or silicone. The reaction of the silicone oil with both reactive terminals and the silane and/or silicone consists of hydrolysis.condensation, and the ratio with which starting materials are charged (fed) is reflected in the product obtained after the reaction.

The terminals of component (A) obtained are preferably silanol (SiOH) groups and/or alkoxysilyl (SiOR') groups (R' represents a hydrocarbon group with one to six carbon atoms and/or a phenyl group). Methoxy, ethoxy, propoxy, isopropoxy, butoxy, isobutoxy, t-butoxy, hexanoxy, phenoxy groups and the like may be listed as examples as the alkoxy group.

Now, when the terminals of component (A) are SiOH groups, component (A) tends to be unstable unless it is dissolved in water that contains an organic solvent. Therefore, the use of a water miscible organic solvent [component (D)] along with water is preferred for the purpose of securing the stability of component (A). When the terminals of component (A) are SiOR' groups, a stable emulsion can be obtained by dissolving it in water that does not contain an organic solvent, and no organic solvent is needed.

<Component (B)>

The emulsion agent that is component (B) is not particularly restricted as long as it emulsifies and disperses component (A) in water [or in a mixed solvent of water and a water miscible organic solvent that is component (D)]. For example, nonionic surfactants such as polyoxyethylene alkyl ethers, polyoxyethylene propylene alkyl ethers, polyoxyethylene alkyl phenyl ethers, polyoxyethylene aliphatic acid esters and the like; anionic surfactants such as alkyl sulfate salts, alkyl benzenesulfonate salts, alkyl sulfosuccinate salts, alkyl phosphate salts, polyoxyethylene alkyl ether sulfate salts, polyoxyethylene alkyl phenyl ether sulfate salts and the like; cationic surfactants such as quaternary ammonium salts, alkylamine acetate salts and the like; and amphoteric surfactants such as alkyl betaine, alkyl imidazoline and the like may be cited.

Of these, nonionic surfactants such as polyoxyethylene alkyl ethers, polyoxyethylene propylene alkyl ethers and polyoxyethylene alkyl phenyl ethers are preferred as component (B) based on stability.

As specific examples of the nonionic surfactants used in component (B), polyoxyethylene octyl ether, polyoxyethylene nonyl ether, polyoxyethylene decyl ether, polyoxyethylene propylene decyl ether, polyoxyethylene lauryl ether, polyoxyethylene propylene lauryl ether, polyoxyethylene tridecyl ether, polyoxyethylene propylene tridecyl ether, polyoxyethylene myristyl ether, polyoxyethylene cetyl ether, polyoxyethylene stearyl ether, polyoxyethylene octyl phenyl ether, poloxyethylene nonyl phenyl ether, polyoxyethylene styrenated phenyl ether and the like may be cited. In addition, these compounds may be used individually or in a combination of at least two of them.

The component (B) content needs to be from one part by weight to fifty parts by weight per one hundred parts by weight of component (A). When the component (B) content is less than one part by weight, it is difficult to form an emulsion. When the content exceeds fifty parts by weight, the hardness, clarity and substrate adhesion properties of the silicone coating film decline. The additive amount of component (B) is preferably from two parts by weight to thirty parts by weight, and from three parts by weight to twenty parts by weight is more preferred.

<Component (C)>

The water that is component (C) is used as a solvent (dispersion medium). Then, an emulsion coating composition of this invention can be prepared by mixing components (A), (B) and (C) [also component (D) as needed] and emulsifying and dispersing them according to a common procedure.

The content of component (C) is from twenty-five parts by weight to two thousand parts by weight per one hundred parts by weight of component (A), but from fifty parts by weight to one thousand parts by weight is preferred.

<Component (D)>

As described above, component (D) that is a water miscible organic solvent may also be used in combination with water. Component (D) is a water miscible organic solvent with an SP value (solubility parameter) of from 8.0 to 11.0 and imparts fluidity when emulsifying component (A) and also enhances emulsion stability.

When the SP value of component (D) is less than 8.0, component (A) cannot be uniformly dissolved in water. When the SP value is greater than 11.0, the emulsion stability declines upon emulsification. The SP value is preferably from 8.5 to 10.5.

Alcohol type compounds, ketone type compounds, ester type compounds, ether type compounds and the like are listed as examples of component (D), but compounds containing alkylene oxide units of these are preferred. Cellosolve, propyl cellosolve, butyl cellosolve, propylene glycol monomethyl ether, propylene glycol monobutyl ether, dipropylene glycol monomethyl ether, methyl carbitol, carbitol, propyl carbitol, butyl carbitol, cellosolve acetate, butyl cellosolve acetate, propylene glycol monomethyl ether acetate, carbitol acetate, butyl carbitol acetate and the like may be listed as specific examples of component (D). Of these, butyl cellosolve, butyl cellosolve acetate, propylene glycol monomethyl ether, propylene glycol monomethyl ether acetate and the like, ordinarily used as film forming aids in paint, are preferred.

The content of component (D) is from zero to fifty parts by weight per one hundred parts by weight of component (A). The content exceeding fifty parts by weight is not favored since the effect becomes saturated and the amount dispersed to the atmosphere when used increases.

In addition, a component (D) conent of less than two parts by weight is not favored when component (A) terminals are SiOH groups since the solution viscosity rises, making emulsification difficult. A preferred component (D) content in this case is from three parts by weight to forty parts by weight, and from five parts by weight to thirty parts by weight is more preferred.

<Emulsion Coating Composition>

The emulsion coating composition obtained in the manner described above preferably contains from 5% by weight to 80% by weight of a non-volatile fraction (solid fraction), and from 10% by weight to 70% by weight is particularly preferred.

The average particle size in the emulsion obtained is preferably from 50 nm to 1,000 nm, and from 100 nm to 800 nm is particularly preferred. The average particle size of an emulsion can be measured using a particle size distribution measuring device (for example, an N4 Plus particle size measuring device manufactured by Beckman Coulter K. K).

The emulsion coating composition described above is cured by a crosslinking of the hydroxyl groups and alkoxy groups [present in component (A) after a reaction] remaining in component (A) using heat when removing water [and also component (D)] used as the solvent. A condensation catalyst for the purpose of accelerating the curing rate or to facilitate curing at a much lower temperature may also be added as necessary when mixing components (A) through (C) in use.

As the condensation catalyst, sodium hydroxide, potassium hydroxide, sodium carbonate, sodium bicarbonate, sodium acetate, potassium acetate, sodium methylate, potassium methylate, n-hexylamine, tributylamine and the like may be cited. A preferred amount of the condensation catalyst to be added is from 0.01 parts by weight to five parts by weight per one hundred parts by weight of component (A), and from 0.1 parts by weight to three parts by weight is particularly preferred.

In addition, in this invention, the emulsion coating composition described above may be used in combination with acrylic resin emulsions and/or urethane resin emulsions and the like. Component (A), in this case, is preferably formulated in a proportion of from 10% by weight to 90% by weight per the entire mixture used in combination.

<Emulsion Coating Composition Applications>

The emulsion coating composition of this invention can be applied to clear or opaque substrate surfaces such as metal, ceramic type inorganic materials, glass, wood, paper products, plastics and the like and can be cured at room temperature or upon heating to form a cured protective coating film. The cured protective coating films are very hard, very flexible, have good adhesion properties and weather resistance and, furthermore, impart water repellency. Therefore, the coating films are suited for undercoating agents for external building materials such as metal, ceramics, wood and the like, coatings such as top coating agents and the like, protective coating agents for metal surfaces such as pre-coated metals and the like, charge controlling coating agents for electrophotographic carriers, adhesives and the like.

The composition of this invention can preferably be used in surface protection or undercoating treatments such as anti-corrosion treatment coatings and the like of iron and stainless steel building and structural materials, aluminum sash building materials and the like, in coatings for electrodeposition applications in automotive and electric appliance, and in surface protection coatings for the magnetic powder used in electro-photographic carriers when the substrate is a metal.

The composition of this invention can preferably be used in surface protection of plastic sheets, magnetic or heat sensitive recording films, packaging films, vinyl cloth and the like, and in function imparting binders when the substrate is a plastic.

The composition of this invention can suitably be used in surface protection coatings for laminated wood, surface protection coatings for heat sensitive recordings and water resistance imparted coatings that are used to treat printed surfaces when the substrates are wood or paper products. In addition, the composition of this invention can suitably be used in surface protection coating films for synthetic leather and the like since the composition has water repellence. In addition, the compositions of this invention can suitably be used as water-soluble binders for water resistant printing inks.

The composition of this invention can suitably be used in surface protection coatings and surface treatment coatings for external wall materials made of mortar, concrete and cement and for ceramic industry panels, ALC sheets, siding boards, plaster boards, bricks, glass, porcelain, cultured marble and the like.

In addition, the composition of this invention can be used as a base polymer in adhesives, and adhesives that bond substrates of different materials effectively can be obtained by adding other organic resins or silane coupling agents.

<Application of Emulsion Coating Composition>

Various known application methods such as dipping methods, spray methods, roller coating methods, brush coating methods and the like may be used as the method to apply an emulsion coating composition of this invention on a substrate. The coating amount for an emulsion coating composition is not particularly restricted, but the coating film thickness after drying is ordinarily from 0.1 µm to 1,000 µm and particularly from 1 µm to 100 µm.

When an emulsion coating composition is used for protective coating film as is without curing, a substrate may be left standing at room temperature to simply allow the water [also component (D) when necessary] to evaporate. However, when crosslinking is allowed to proceed through room temperature curing to obtain a high hardness coating film, a good cured coating film can be obtained after a condensation catalyst is added to the emulsion composition and the coated substrate is left standing for 0.1 day to thirty days at room temperature. In addition, when crosslinking is allowed to proceed through heated curing and a high hardness coating film is targeted, the coating film is obtained by not adding or adding a condensation catalyst and the substrate coated with this is maintained for 0.5 minutes to two hundred hours at a temperature range of from 50° C. to 300° C.

EXAMPLES

This invention is more specifically described below by citing examples and comparative examples, but this invention is not limited to the examples described below. In addition, "%" indicates % by weight in the descriptions below.

Example 1

Toluene was added to a silicone oil with both reactive terminals represented by Cl—[$(CH_3)_2$Si—O—]$_{39}$—$(CH_3)_2$Si—Cl and a chlorosilane mixture comprising $C_6H_5$—$SiCl_3$, $CH_3SiCl_3$ and $(C_6H_5)_2$—$SiCl_2$, and hydrolysis.condensation was conducted. The HCl formed as a by-product was removed by washing the reaction system with water to prepare a 50% toluene solution. The feed ratio of the silicone oil with both reactive terminals and the chlorosilane mixture, on the assumption that they undergo hydrolysis.condensation to form an organosilicone resin, was set to allow 20 mole % of the Si atoms in the organosilicone resin to constitute a chain-like continuous structure represented by —[$(CH_3)_2$Si—O—]$_{40}$—. Now, in this case, the average composition formula of the organosilicone resin was represented by [$C_6H_5$—$SiO_{3/2}$]$_{0.20}$[$CH_3$—$SiO_{3/2}$]$_{0.50}$[$(C_6H_5)_2$—$SiO_{2/2}$]$_{0.10}$[$(CH_3)_2$$SiO_{2/2}$]$_{0.20}$. The weight average molecular weight was 3,800, and the molecular terminals were SiOH.

One kilogram of this toluene solution and 125 g of butyl cellosolve acetate (SP value 8.9) that is component (D) were placed in a distillation apparatus equipped with a pressure reduction device, and toluene was removed by distillation at 60° C. and 3999 Pa (30 mmHg). The remaining solution was left standing for three hours and was analyzed using gas chromatography. The results indicated that the toluene concentration in the remaining solution was 0%, and the butyl cellosolve acetate concentration was 20.0%. In addition, the non-volatile fraction in the butyl cellosolve acetate solution of the organosilicone resin was 80.0%.

Five hundred grams of the butyl cellosolve acetate solution of the organosilicone resin (component A) described above, 25 g of NOIGEN XL40 (polyoxyalkylene decyl ether manufactured by DAI-ICHI KOGYO SEIYAKU CO., LTD. HLB 10.5), 25 g of NOIGEN XL400 (polyoxyalkylene decyl ether manufactured by DAI-ICHI KOGYO SEIYAKU CO., LTD. HLB 18.4) and 5 g of Newcol 291M (NIPPON NYUKAZAI CO., LTD. 75% sodium alkyl sulfosuccinate solution) as the emulsification agents that are component (B), and 445 g of ion exchanged water that is component (C) were mixed and emulsified using a homo-disperser to obtain a blue-white emulsion coating agent composition A. The average particle size was measured using a particle size distribution measuring device (Beckman Coulter K. K., product name N4 Plus) and found to be 210 nm. No separation occurred after the composition was left standing for a month at room temperature.

Example 2

A silicone oil with both reactive terminals represented by $CH_3O$—[$(CH_3)_2$Si—O—]$_{29}$—$(CH_3)_2$Si—$OCH_3$ and an alkoxysilane mixture comprising $C_6H_5$—$Si(OCH_3)_3$ and $CH_3$—Si $(OCH_3)_3$ were allowed to undergo hydrolysis.condensation. The feed ratio of the silicone oil both two reactive terminals and the alkoxysilane mixture, on the assumption that they undergo hydrolysis.condensation to form an organosilicone resin, was set to allow 50% by mole of the Si atoms in the organosilicone resin to constitute a chain-like continuous structure represented by —[$(CH_3)_2$Si—O—]$_{30}$—. Now, in this case, the average composition formula of the organosilicone resin was represented by [$C_6H_5$—$SiO_{3/2}$]$_{0.30}$[$CH_3$—$SiO_{3/2}$]$_{0.20}$[$(CH_3)_2$$SiO_{2/2}$]$_{0.50}$. The weight average molecular weight was 4,200, and the molecular terminals were $SiOCH_3$.

Four hundred grams of the solution of the organosilicone resin (component A) described above, 25 g of NOIGEN XL40 (polyoxyalkylene decyl ether manufactured by DAI-ICHI KOGYO SEIYAKU CO., LTD. HLB 10.5), 25 g of NOIGEN XL400 (polyoxyalkylene decyl ether manufactured by DAI-ICHI KOGYO SEIYAKU CO., LTD. HLB 18.4) and 5 g of Newcol 291M (NIPPON NYUKAZAI CO., LTD. 75% sodium alkyl sulfosuccinate solution) as emulsification agents that are component (B), and 445 g of ion exchanged water that is component (C) were mixed and emulsified using a homo-disperser to obtain a blue-white emulsion coating agent composition, B. The average particle size was measured using a particle size distribution measuring device (Beckman Coulter K. K., product name N4Plus) and was 230 nm. No separation occurred after the composition was left standing for a month at room temperature.

Example 3

Toluene was added to a silicone oil with two reactive terminals represented by Cl—[(CH$_3$)$_2$Si—O—]$_{29}$—(CH$_3$)$_2$Si—Cl and a silane mixture comprising (CH$_3$)$_2$—SiCl$_2$, CH$_3$SiCl$_3$ and Si—(OC$_2$H$_5$)$_4$, and hydrolysis.condensation was conducted. The HCl and EtOH formed as by-products were removed by washing [the reaction system] with water to prepare a 50% toluene solution. The feed ratio of the silicone oil with two reactive terminals and the silane mixture, on the assumption that they undergo hydrolysis.condensation to form an organosilicone resin, was set to allow 20% by mole of the Si atoms in the organosilicone resin constitute a straight chain continuous structure represented by —[(CH$_3$)$_2$Si—O—]$_{30}$—. Now, in this case, the average composition formula of the organosilicone resin was represented by [CH$_3$—SiO$_{3/2}$]$_{0.65}$[(CH$_3$)$_2$—SiO$_{2/2}$]$_{0.30}$[SiO$_{4/2}$]$_{0.05}$. The weight average molecular weight was 4,400, and the molecular terminals were SiOH.

One kilogram of this toluene solution and 125 g of butyl cellosolve acetate (SP value 8.9) that is component (D) were placed in a distillation apparatus equipped with a pressure reduction device, and toluene was removed by distillation at 60° C. and 3999 Pa (30 mmHg). The remaining solution was left standing for three hours and was analyzed using gas chromatography. The results indicated that the toluene concentration in the remaining solution was 0%, and the butyl cellosolve acetate concentration was 19.8%. In addition, the non-volatile fraction in the butyl cellosolve acetate solution of the organosilicone resin was 80.2%.

Five hundred grams of a butyl cellosolve acetate solution of the organosilicone resin (component A) described above, 25 g of NOIGEN XL40 (polyoxyalkylene decyl ether manufactured by DAI-ICHI KOGYO SEIYAKU CO., LTD. HLB 10.5), 25 g of NOIGEN XL400 (polyoxyalkylene decyl ether manufactured by DAI-ICHI KOGYO SEIYAKU CO., LTD. HLB 18.4) and 5 g of Newcol 291M (NIPPON NYUKAZAI CO., LTD. 75% sodium alkyl sulfosuccinate solution) as emulsification agents that are component (B), and 445 g of ion exchanged water that is component (C) were mixed and emulsified using a homo-disperser to obtain a blue-white emulsion coating agent composition, C. The average particle size was measured using a particle size distribution measuring device (Beckman Coulter K. K., product name N4Plus) and was 220 nm. No separation occurred after the composition was left standing for a month at room temperature.

Comparative Example 1

A butyl cellosolve acetate solution of an organosilicone resin was produced in exactly the same manner described in Example 1 with the exception that (CH$_3$)$_2$Si—Cl$_2$ was used in place of a silicon oil with two reactive terminals represented by Cl—[(CH$_3$)$_2$Si—O—]$_{39}$—(CH$_3$)$_2$Si—Cl. In this case, (CH$_3$)$_2$Si—Cl$_2$ and the chlorosilane mixture described above were co-hydrolyzed. Individual components are uniformly introduced, and a chain-like continuous structure is not contained in the organosilicone resin formed.

The feed ratio of (CH$_3$)$_2$Si—Cl$_2$ and the chlorosilane mixture described above, on the assumption that they undergo hydrolysis.condensation to form an organosilicone resin, was set to achieve the identical average composition formula of the organosilicone resin shown in Example 1 ([C$_6$H$_5$—SiO$_{3/2}$]$_{0.20}$[CH$_3$—SiO$_{3/2}$]$_{0.50}$[(C$_6$H$_5$)$_2$—SiO$_{2/2}$]$_{0.10}$[(CH$_3$)$_2$—SiO$_{2/2}$]$_{0.10}$[CH$_3$SiO$_{2/2}$]$_{0.20}$) The weight average molecular weight was 3,900, and the molecular terminals were SiOH.

A 50% toluene solution of the organosilicone resin described above was used to conduct emulsification in exactly the same manner used in Example 1 to obtain a white emulsion coating agent composition, D. The average particle size was measured using a particle size distribution measuring device (Beckman Coulter K. K., product name N4Plus) and was 220 nm. No separation occurred after the composition was left standing for a month at room temperature.

Comparative Example 2

A silicone oil with two reactive terminals represented by HO—[(CH$_3$)$_2$Si—O—]$_{29}$—(CH$_3$)$_2$Si—OH was used in place of the silicone oil with two reactive terminals used in Example 2, and KOH was used as the basic catalyst to conduct equilibration. This reaction was different from the hydrolysis.condensation described above, and the silicone resin obtained was a mixture containing as the major component an oligomer component with alkoxy terminals and a degree of polymerization of about two to ten, due to large alkoxy group ratio, and a small amount of dimethyl polysiloxane with an average degree of polymerization of at least one hundred and fifty. The degree of polymerization was measured using GPC (gel permeation chromatography). As described above, this silicone resin contained a straight chain structure but the degree of polymerization was at least one hundred and fifty.

A 50% toluene solution of the product described above was used and was emulsified in exactly the same manner described in Example 1 to obtain a white emulsion coating agent composition, E. The average particle size was measured using a particle size distribution measuring device (Beckman Coulter K. K., product name N4Plus) and was 240 nm. And separation occurred after the composition was left standing for a month at room temperature.

<Evaluation>

Cured coating films obtained by curing the emulsion coating agent compositions A through E obtained in the individual examples and the comparative examples were evaluated in the order described below.

First, individual emulsion coating agent compositions were applied to steel sheets with clean polished surfaces to obtain cured film thicknesses of about 50 µm and were cured under the conditions indicated in Table 1.

The clarifies of the cured coating films obtained were visually evaluated, and a clear colorless film was denoted with O, a semi-transparent film was denoted with Δ and a turbid film was denoted with X. In addition, the hardness of the cured coating film was measured according to the scratch hardness method (pencil method) described in JIS K5600.

The adhesion of the cured coating film was tested using an adhesion property test method (cross cut method) using cellophane tape (registered trade mark). A cutter knife was used to cut the coating film into 10×10 squares in the cross cutting method, cellophane tape (registered trade mark) was applied to the coating film and the number of squares remaining on the coating film side when the tape was removed was counted in this method. If a coating film was reported to have 100/100 in Table 1, all one hundred squares remained indicating that the coating film adhered well.

The weather resistance of the cured coating film was conducted by visually examining the condition of the film after three thousand hours of testing using a sunshine weatherometer as specified in JIS K5400. A film that did not undergo changes in the coating film properties and uncolored upon irradiation was indicated by O, a film with poor adhesion (slight peeling from the steel sheet) and slightly turned yellow was indicated by Δ and a coating film that peeled away from the steel sheet and exhibited cracks was indicated by X.

The results obtained are shown in Table 1 Now, in the case of Examples 1 and 2, the curing catalysts shown in Table 1 were used to cure the emulsion coating agent compositions.

TABLE 1

| | | Example 1 | Example 2 | Example 3 | Comparative Example 1 | Comparative Example 2 |
|---|---|---|---|---|---|---|
| Degree of polymerization of dimethyl polysiloxane in component A | | 40 | 30 | 30 | 0 | At least 150 |
| Proportion of Si atoms in chain-like structure per total Si atoms in component A (mol %) | | 20 | 50 | 20 | 0 | — |
| Curing catalyst | Aqueous 5% sodium | 10 | 10 | | | |
| Curing conditions | Temperature (° C.) | 80 | 80 | 150 | 150 | 150 |
| | Time (minutes) | 15 | 15 | 30 | 30 | 30 |
| Evaluation | Clarity | O | O | O | O | Δ |
| | Scratch hardness | 4H | H | 6H | 4H | H |
| | Adhesion | 100/100 | 100/100 | 100/100 | 100/100 | 90/100 |
| | Weather resistance | O | O | O | X | X |

As clearly indicated by the data in Table 1, the emulsion coating agent compositions of the examples yielded cured coating films with excellent clarity, hardness, adhesion properties and weather resistance.

In contrast, the weather resistance was poor in the case of Comparative Example 1 that does not contain a chain-like continuous structure in the organosilicone resin that is component A. The results were attributed to the ease with which cracks were generated due to reduced coating film flexibility.

In addition, the clarity, hardness and weather resistance of the cured coating film were poor in the case of Comparative Example 2. The results were attributed to the severing of the chain-like structure in the silicone oil since the silicone resin was produced using alkali induced equilibration, the silicone coating film hardness was not consistent and the coating film was not uniform.

What is claimed is:

1. An emulsion coating agent composition containing:
(A) one hundred parts by weight of an organosilicone resin obtained by hydrolysis and/or condensation of a mixture of a silicone oil having both reactive terminals represented by X—[R$_2$Si—O—]$_m$—R$_2$Si—X (R is selected from monovalent hydrocarbon groups containing one to twenty carbon atoms and/or aryl groups, and each R is same or different groups, X is a hydrolyzable group and/or an OH group, and m is a natural number from three to one hundred) and one or more hydrolyzable silanes represented by the formulas R$_3$SiX, R$_2$SiX$_2$, RSiX$_3$, SiX$_4$ and partially hydrolyzed and condensed oligomers derived therefrom, wherein the organosilicone resin contains a chain-like continuous structure indicated by —[R$_2$Si—O—]$_{m+1}$— (R and m are both identical to the R and m in the formula showing the silicone oil with both reactive terminals), and 5 mole % to 60 mole % of the total Si atoms in the organosilicone resin form the chain-like continuous structure indicated by —[R$_2$Si—O—]$_{m+1}$;
(B) one part by weight to fifty parts by weight of an emulsifier; and
(C) twenty-five parts by weight to two thousand parts by weight of water; and wherein the emulsion coating agent composition is prepared by mixing resin (A) with (B) and (C); and wherein the emulsion coating agent composition further comprises (D), a water miscible organic solvent selected from the group consisting of propyl cellosolve, propylene glycol monobutyl ether, dipropylene glycol monomethyl ether, methyl carbitol, propyl carbitol, butyl cellosolve acetate, propylene glycol monomethyl ether acetate, carbitol acetate, and butyl carbitol acetate.

2. The emulsion coating agent composition described in claim 1, wherein (D) comprises three to fifty parts of the water miscible organic solvent by weight per one hundred parts by weight of (A),
and the composition contains substantially no organic solvent other than component (D).

3. The emulsion coating agent composition described in claim 2, wherein the proportion of —CH$_3$ groups to the organic substituents in the organosilicone resin that is component (A) is from 50 mole % to 100 mole %.

4. The emulsion coating agent composition described in claim 3, wherein the component (D) is butyl cellosolve acetate or propylene glycol monomethyl ether acetate.

5. A product having a substrate surface coated with a cured material of the emulsion coating composition described in claim 3.

6. The emulsion coating agent composition described in claim 2, wherein the molecular terminals of the organosilicone resin that is component (A) are silanol (SiOH) groups and/or alkoxysilyl (SiOR') groups (R' represents a hydrocarbon group with one to six carbon atoms and/or a phenyl group).

7. The emulsion coating agent composition described in claim 2, wherein the component (D) is butyl cellosolve acetate or propylene glycol monomethyl ether acetate.

8. A product having a substrate surface coated with a cured material of the emulsion coating composition described in claim 2.

9. The emulsion coating agent composition described in claim 1, wherein the proportion of —CH$_3$ groups to the organic substituents in the organosilicone resin that is component (A) is from 50 mole % to 100 mole %.

10. The emulsion coating agent composition described in claim 9, wherein the molecular terminals of the organosilicone resin that is component (A) are silanol (SiOH) groups and/or alkoxysilyl (SiOR') groups (R' represents a hydrocarbon group with one to six carbon atoms and/or a phenyl group).

11. The emulsion coating agent composition described in claim 9, wherein the water miscible organic solvent is butyl cellosolve acetate or propylene glycol monomethyl ether acetate.

12. A product having a substrate surface coated with a cured material of the emulsion coating composition described in claim 9.

13. The emulsion coating agent composition described in claim 1, wherein the molecular terminals of the organosilicone resin that is component (A) are silanol (SiOH) groups and/or alkoxysilyl (SiOR') groups (R' represents a hydrocarbon group with one to six carbon atoms and/or a phenyl group).

14. A product having a substrate surface coated with a cured material of the emulsion coating composition described in claim 13.

15. The emulsion coating agent composition described in claim 1, wherein the component (D) is butyl cellosolve acetate or propylene glycol monomethyl ether acetate.

16. A product having a substrate surface coated with a cured material of the emulsion coating composition described in claim 1.

17. The emulsion coating agent composition described in claim 1, wherein X is a hydrolyzable group.

18. The emulsion coating agent composition described in claim 1, wherein X is selected from Cl, alkoxy, acyloxy, isopropenoxy, and amino.

19. The emulsion coating agent composition described in claim 1, wherein (A) is prepared in the absence of a solvent or in a solvent selected from the group consisting of methanol, ethanol, methyl ethyl ketone, hexane, toluene, water and mixtures thereof.

20. An emulsion coating agent composition consisting of:
(A) one hundred parts by weight of an organosilicone resin obtained by hydrolysis and/or condensation of a mixture of a silicone oil having both reactive terminals and one or more hydrolyzable silanes represented by the formulas R$_3$SiX, R$_2$SiX$_2$, RSiX$_3$, SiX$_4$ and partially hydrolyzed and condensed oligomers derived therefrom, wherein the silicone oil is represented by X—[R$_2$Si—O—]$_m$—R$_2$Si—X, wherein R is selected from monovalent hydrocarbon groups containing one to twenty carbon atoms and/or aryl groups, and each R is same or different groups, X is a hydrolyzable group and/or an OH group, and m is a natural number from three to one hundred, and wherein the organosilicone resin contains a chain-like continuous structure indicated by —[R$_2$Si—O—]$_{m+1}$—, wherein R and m are both identical to the R and m in the formula for the silicone oil, and 5 mole % to 60 mole % of the total Si atoms in the organosilicone resin form the chain-like continuous structure indicated by —[R$_2$Si—O—]$_{m+1}$;
(B) one part by weight to fifty parts by weight of an emulsifier; and
(C) twenty-five parts by weight to two thousand parts by weight of water.

21. An emulsion coating agent composition consisting of:
(A) one hundred parts by weight of an organosilicone resin obtained by hydrolysis and/or condensation of a mixture of a silicone oil having both reactive terminals and one or more hydrolyzable silanes represented by the formulas R$_3$SiX, R$_2$SiX$_2$, RSiX$_3$, SiX$_4$ and partially hydrolyzed and condensed oligomers derived therefrom, wherein the silicone oil is represented by X—[R$_2$Si—O—]$_m$—R$_2$Si—X, wherein R is selected from monovalent hydrocarbon groups containing one to twenty carbon atoms and/or aryl groups, and each R is same or different groups, X is a hydrolyzable group and/or an OH group, and m is a natural number from three to one hundred, and wherein the organosilicone resin contains a chain-like continuous structure indicated by —[R$_2$Si—O—]$_{m+1}$—, wherein R and m are both identical to the R and m in the formula for the silicone oil, and 5 mole % to 60 mole % of the total Si atoms in the organosilicone resin form the chain-like continuous structure indicated by —[R$_2$Si—O—]$_{m+1}$;
(B) one part by weight to fifty parts by weight of an emulsifier;
(C) twenty-five parts by weight to two thousand parts by weight of water; and
(D) a water miscible organic solvent having a solubility parameter of from 8.0 to 11.0, wherein the content of (D) is from zero to fifty parts by weight per one hundred parts by weight of (A).

* * * * *